United States Patent
Elkouh et al.

(10) Patent No.: US 6,874,676 B1
(45) Date of Patent: Apr. 5, 2005

(54) METHOD AND STRUCTURE FOR WELDING AN AIR-SENSITIVE METAL IN AIR

(75) Inventors: Nabil A. Elkouh, Meriden, NH (US); Michael D. Jaeger, Plainfield, NH (US); Stephen Luckowski, Bloomfield, NJ (US)

(73) Assignee: Creare Inc., Hanover, NH (US)

( * ) Notice: Subject to any disclaimer, the term of this patent is extended or adjusted under 35 U.S.C. 154(b) by 0 days.

(21) Appl. No.: 10/139,673

(22) Filed: May 6, 2002

Related U.S. Application Data

(60) Provisional application No. 60/288,973, filed on May 4, 2001.

(51) Int. Cl.[7] ........................... B23K 1/20; B23K 31/02; B23K 9/04
(52) U.S. Cl. .................................. 228/208; 219/73.11
(58) Field of Search ........................... 219/64, 73, 73.1, 219/73.11, 73.21, 74, 75, 137.2, 137 WM, 54, 76.1, 76.14, 120, 121.11, 121.45, 121.47, 136, 146.1; 148/23, 24; 228/208

(56) References Cited

U.S. PATENT DOCUMENTS

| | | | |
|---|---|---|---|
| 3,636,301 A | * | 1/1972 | Ischenko et al. ........ 219/137 R |
| 3,924,091 A | * | 12/1975 | Suzuki et al. .................. 219/73 |
| 3,992,454 A | | 11/1976 | Kessler ........................ 260/590 |
| 4,004,064 A | | 1/1977 | Kessler ........................ 428/421 |
| 4,040,822 A | * | 8/1977 | Stern ........................... 420/530 |
| 4,110,117 A | * | 8/1978 | McLeod ..................... 106/1.17 |
| RE29,852 E | | 11/1978 | Kessler ........................ 260/590 |
| 4,149,063 A | * | 4/1979 | Bishel .................... 219/146.23 |
| 4,186,293 A | | 1/1980 | Gonzalez et al. ...... 219/146.24 |
| 4,376,881 A | * | 3/1983 | Safonnikov et al. ....... 219/73.1 |
| 4,404,447 A | * | 9/1983 | Kitamura et al. ............. 219/64 |
| 4,551,610 A | | 11/1985 | Amata ....................... 219/146.3 |
| 4,625,095 A | * | 11/1986 | Das ....................... 219/137 WM |
| 4,662,952 A | * | 5/1987 | Barringer et al. ............. 148/23 |
| 4,788,411 A | * | 11/1988 | Skinner ....................... 219/127 |
| 4,933,141 A | * | 6/1990 | Mankins et al. .............. 419/67 |
| 5,091,628 A | | 2/1992 | Chai et al. ............. 219/145.22 |
| 5,132,514 A | | 7/1992 | Chai et al. ............. 219/145.22 |
| 5,134,040 A | * | 7/1992 | Benz et al. .................. 428/646 |
| 5,139,888 A | * | 8/1992 | Selwood et al. ............ 428/594 |

(Continued)

OTHER PUBLICATIONS

Zamkov, V.; *Technologies and Materials Developed by the Paton Electric Welding Institute for Welding of Titanium*; ASM Interantional European Conf. on Welding and Joining Science and Technology, Madrid, Spain, Mar. 1997, Boulevard St. Michel, Brussels: ASM Int. Europe, 1997, pp. 296–312.

(Continued)

*Primary Examiner*—Lynne R. Edmondson
(74) *Attorney, Agent, or Firm*—Downs Rachlin Martin PLLC

(57) ABSTRACT

A method and structure for welding an air-sensitive metal, such as titanium, in an ambient environment containing air. The method (10) includes forming a weld (12) through a weld-through coating (14) applied to the weld face(s) (28) and heat-affected zone (30) of one or more workpiece(s) (16) to be welded. The weld-through coating may contain a reactive material that comprises one or more halogenides of alkali metal, e.g., fluorides of barium, calcium, and strontium. The weld-through coating may be applied to the workpiece using a thermal-spray process, such as a plasma-spray process (32), prior to forming the weld. The weld-through coating may be applied to the workpiece(s) generally contemporaneously with the formation of the weld just ahead of the weld or may be applied at any time prior to forming the weld.

34 Claims, 2 Drawing Sheets

U.S. PATENT DOCUMENTS

| | | | |
|---|---|---|---|
| 5,225,661 A | | 7/1993 | Chai et al. ............. 219/145.22 |
| 5,456,740 A | * | 10/1995 | Snow et al. ................... 96/11 |
| 5,802,716 A | * | 9/1998 | Nishimura et al. ...... 29/888.06 |
| 5,879,437 A | * | 3/1999 | Hartman .................. 106/14.44 |
| 2002/0168466 A1 | * | 11/2002 | Tapphorn et al. ........... 427/180 |
| 2002/0175205 A1 | * | 11/2002 | Wittebrood et al. ........ 228/249 |

OTHER PUBLICATIONS

Zamkov, V. N., Priluiskii, V.P., and Novikov, Y.K; *Latest Achievements in Welding Titanium; The Paton Welding Journal*, V46(5), 1993, pp. 302–304.

* cited by examiner

METHOD AND STRUCTURE FOR WELDING AN AIR-SENSITIVE METAL IN AIR

RELATED APPLICATION DATA

This application claims the benefit of priority of U.S. Provisional Patent Application No. 60/288,973, filed May 4, 2001, entitled "Method and Structure for Welding an Air-Sensitive Metal in Air."

STATEMENT OF GOVERNMENT RIGHTS

This invention was made with Government support under contract DAAE-3-99-C-1020 awarded by the U.S. Army TACOM-ARDEC. The Government has certain rights in the invention.

FIELD OF THE INVENTION

The present invention generally relates to the field of welding. More particularly, the present invention is directed to a method of, and structure for, welding an air-sensitive metal in air.

BACKGROUND OF THE INVENTION

In general, a weld is a localized coalescence, i.e., unified body, of materials produced by heating the materials to a suitable temperature, usually to form a joint between two or more workpieces. In metal welding, the heat is typically generated using an electrode that carries current from a current source to the workpiece(s) to be welded by placing the electrode sufficiently near the region(s) of the workpiece(s) to be welded. Conventionally, the metal of the workpiece(s) is known as the base metal. In some welding processes the electrode is a consumable electrode that provides a filler metal that adds to the amount of metal in the weld. In other welding processes the electrode is non-consumable. Non-consumable electrodes may be used either with or without a filler metal. If a filler metal is required, it may be supplied to the welding process, e.g., as a metal wire, rod, or other form.

In general, it would be highly desirable to be able to weld any type of base metal in an ambient-air environment without any detrimental effects to the weld due to the presence of the air. However, when metals are heated to welding temperatures, they can become contaminated by one or more of the components of the air, e.g., oxygen, hydrogen, and nitrogen, to form various defects within the weld and/or the region(s) adjacent the weld that are heated to a temperature high enough for such contamination to occur. These adjacent regions are typically collectively referred to as the heat-affected zone (HAZ). Different base metals have different sensitivities to air at welding temperatures. The more sensitive a base metal is to air, the more detrimental the contamination will be to the weld and/or HAZ. The presence of contaminants within a weld and/or HAZ can lead to partial or total failure of the weld.

Over the years, the welding of some metals, such as steel and aluminum, in an ambient-air environment has been improved through the use of various fluxes that vaporize during welding and provide a relatively inert, shield-like environment at the weld and HAZ during the most critical time, i.e., during the coalescing and cooling of the base metal, and the filler metal, if present. In some welding processes, these fluxes are typically provided as a coating on each consumable electrode or in a hollow core within each consumable electrode. In other welding processes, particularly submerged arc welding (SAW), fluxes are typically provided in a layer of granules that cover the region(s) to be welded. Welding is then performed through the layer of granules. Obviously, SAW must be performed where welds will be formed in a substantially horizontal plane. Properly-formed steel and aluminum welds made in an ambient air environment using these fluxes are largely free of air contamination and corresponding defects.

However, other metals, such as titanium, molybdenum, tantalum and other refractory metals, are particularly sensitive to air at welding temperatures. For example, the extreme reactivity of titanium with oxygen leads to the formation of a thin protective oxide at room temperature. However, at welding temperatures, the oxide grows and offers little or no protection to a weld and HAZ. Hydrogen contamination manifests itself as a loss of ductility, perhaps through the formation of hydride phases or as cracking due to precipitation of hydrogen within voids or cracks in the weld and/or HAZ. Thus, to produce a weld of acceptable quality in titanium, the weld and HAZ must be well shielded from contamination by air.

Most conventional techniques for welding titanium require that the regions to be welded be both free of surface contaminants and protected from exposure to air. Prior to welding, the titanium must be rigorously and completely cleaned to remove contaminants that contain carbon, oxygen, and hydrogen that can significantly compromise the quality of the weld. For example, the oxide scale may be completely removed using a method such as acid pickling with a solution containing hydrofluoric and nitric acids.

The cleaned titanium must then be protected from air and its constituent components. In general, there are two common conventional techniques for protecting titanium during welding. These are: (1) welding inside a chamber filled with one or more inert gases; and (2) providing a trailing shield large enough to protect the weld and HAZ. These two techniques are generally associated with parts of different sizes. That is, small parts are typically welded in an enclosed chamber. Cleaned tools and parts are loaded into the chamber, followed by backfilling of the chamber with one or more inert gases, such as argon or helium. Welding takes place after all air is purged from the chamber.

In contrast, large parts are typically welded by providing a shroud for the weld region and entire HAZ for containing one or more inert gases, such as argon or helium. Shrouds can be custom made for each weld geometry. The welding tool, which typically includes an electrode surrounded by an annular passageway for providing shielding gas, must not itself entrain air. Trailing shields are used to protect the metal, both weld and HAZ, behind the tool as the tool is moved along the weld joint. The back side of the welded joint must also be protected with shielding gas from a back-side shroud system. A back-side shrouding fixture must fit with virtually no gap between it and the titanium parts since air may be drawn into the shroud system, resulting in contamination.

Conventional techniques for welding titanium are generally very cumbersome and labor intensive and are a major impediment to the widespread use of titanium and other air-sensitive metals in situations where welding is desirable or required. A less costly and more convenient technique for protecting titanium from reactive ambient-air environments during welding of the titanium could lead to more widespread use of titanium and other air-sensitive metals.

SUMMARY OF THE INVENTION

In one aspect, the present invention is directed to a method of welding a workpiece having a weld face. The method comprises the step of forming at the weld face a weld through a weld-through coating applied to the weld face, wherein the weld-through coating comprises a reactive material.

In another aspect, the present invention is directed to a workpiece comprising a base metal having a weld face and a weld-through coating covering at least a portion of the weld face, wherein the weld-through coating comprises a reactive material.

In a further aspect, the present invention is directed to a structure comprising a first part and a second part located adjacent the first part. A weld connects the first part and the second part to one another. The weld is formed by welding through at least a portion of a weld-through coating applied to at least one of the first and second parts, wherein the weld-through coating comprises a reactive material.

BRIEF DESCRIPTION OF THE DRAWINGS

For the purpose of illustrating the invention, the drawings show a form of the invention that is presently preferred. However, it should be understood that the present invention is not limited to the precise arrangements and instrumentalities shown in the drawings, wherein.

DETAILED DESCRIPTION OF THE DRAWINGS

Figure 1:
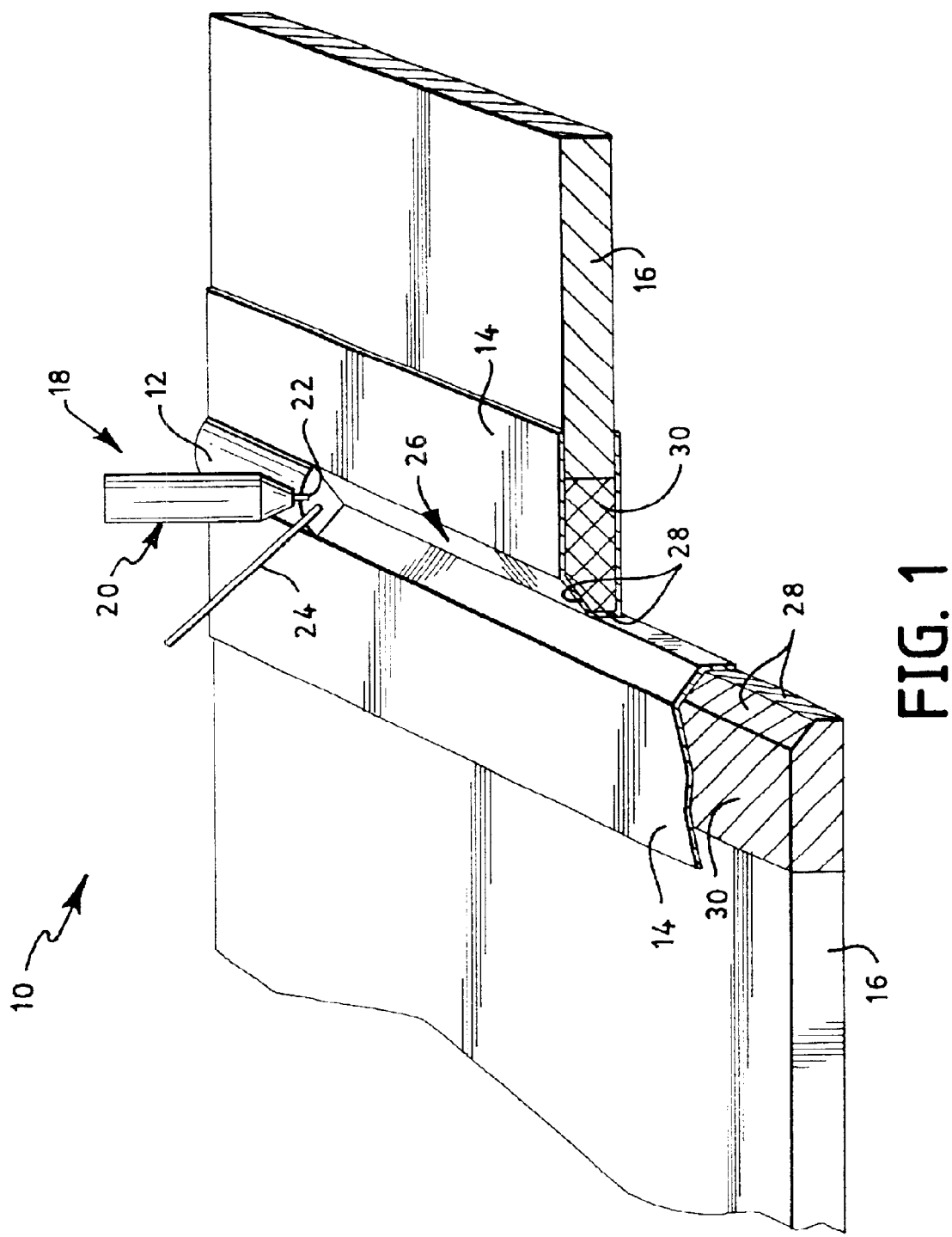
FIG. 1 is a perspective view, showing several cutaway portions, of two workpieces being joined to one another using a welding method of the present invention.

Referring now to the drawings, wherein like numerals indicate like elements, there is illustrated in accordance with the present invention a welding method, which is generally denoted by the numeral 10. Welding method 10 may be used with any base metal, but is particularly useful for welding base metals that are air-sensitive, i.e., are relatively highly reactive with, or otherwise influenced by, one or more of the constituent components of air, such as oxygen, hydrogen, and nitrogen. Examples of air-sensitive metals include the following elemental metals: titanium; molybdenum; tantalum; and refractory metals, such as niobium and hafnium, and alloys of such air-sensitive elemental metals. For convenience, the present invention is described below primarily in connection with titanium. Those skilled in the art, however, will understand the modifications necessary to adapt the present invention to other base metals.

In general, welding method 10 comprises forming a weld 12 through a weld-through coating 14 applied to one or more workpieces 16 prior to forming the weld. Weld 12 formed in an ambient-air environment through weld-through coating 14 of the present invention will generally have a fatigue strength and a yield strength substantially equal to the corresponding yield and fatigue strengths of a comparably-sized weld formed in a conventional gas-shielded environment due to the composition of the weld-through coating, which forms a protective environment for the weld prior to, during, and/or subsequent to the formation of the weld. Accordingly, weld-through coating is particularly useful in connection with air-sensitive base metals where welds formed in conjunction therewith in an ambient-air environment would have fatigue and yield strengths significantly, and unacceptably, lower than the strength of a comparably-sized weld formed in a conventional gas-shielded environment. Welding method 10 and weld-through coating 14 are described below in detail.

Once weld-through coating 14 has been applied as described below, weld 12 may be formed using any metal welding process 18 known in the art, such as carbon arc welding (CAW), shielded metal arc welding (SMAW), submerged arc welding (SAW), gas tungsten arc welding (GTAW) (also known as tungsten inert gas (TIG) welding), plasma arc welding (PAW), gas metal arc welding (GMAW), which includes metal inert gas (MIG) and metal active gas (MAG) welding, flux-cored arc welding (FCAW), and oxygas welding, among others. For example, welding process 18 may be a TIG welding process that utilizes a welding tool 20 having a TIG-type electrode 22 and a filler metal source 24, such as a wire or rod, that provides any filler metal needed to properly form weld 12. Other welding processes 18 may utilize other types of welding tools 20 and/or may not require filler metal source 24. Those skilled in the art will understand the various welding processes 18 that may be used with the present invention such that these welding processes need not be described in detail herein. In addition, filler metal source 24 may be a coated and/or filled-core wire, rod, or other structure coated or filled with the same materials described below in connection with weld-through coating 14.

It is noted that welding method 10 is shown in connection with forming weld 12 between two plate-like workpieces 16 at a V-groove butt joint 26. Those skilled in the art will readily appreciate that welding method is not so limited. For example, workpieces 16 may be any shapes that may be joined to one another by welding. Accordingly, joint 26 may be any type of joint capable of being welded, e.g., a butt joint, lap joint, flush joint, or corner joint, among others, and weld 12 may be any type of weld, such a groove weld, fillet weld, slot weld, bead weld or spot weld, among others. Alternatively, only one workpiece 16 may be present, e.g., when the workpiece contains one or more regions (not shown), such as an opening, notch or groove, to be filled, built up, or otherwise welded.

As those skilled in the art will readily appreciate, each workpiece 16 may be a part of a larger structure. For example, each workpiece 16 may be a piece of armor of a vehicle, e.g., a tank, armored personnel carrier, ship, armored car, or aircraft, among others, or a fixed structure, such as a bunker or attack shelter, among others. In addition, each workpiece 16 may be a part of a frame, skin, and/or other part of a terrestrial vehicle, such as an over-land vehicle, e.g., an automobile, truck, and bicycle, among others, watercraft, e.g., a ship, boat, or barge, among others, or under-sea craft, e.g., a submarine, or an extra-terrestrial vehicle, e.g., an aircraft or spacecraft. In addition, each workpiece 16 may be part of another structure, such as an off-shore drilling platform, bridge, storage tank, reactor vessel, or building, to name just a few. The possible structures that may be fabricated using welding method 10 of the present invention are virtually limitless. Thus, the structures specifically listed above are merely a small fraction of the structures that may be welded in accordance with the present invention. Any structure containing at least one workpiece welded using welding process 10 may be considered to be within the scope of the present invention.

Each workpiece 16 may include one or more weld faces 28 and a corresponding heat-affected zone (HAZ) 30 located immediately adjacent the weld face(s). Weld-through coating 14 may be applied to each workpiece 16 in a region substantially coextensive with HAZ 30, or within a region coextensive with only a portion of the HAZ, e.g., at the one or more weld faces 28. In general, weld-through coating need not be applied beyond HAZ 30 since detrimental effects to the base metal of forming weld 12 typically do not occur beyond the HAZ. However, for various reasons, including not knowing the exact extent of HAZ 30 and desiring to provide weld-through coating 14 with a conservative excess, among others, the weld-through coating may extend somewhat beyond the HAZ. Thus, it may be said that it is preferable to apply weld-through coating substantially only at HAZ 30.

As discussed in the background section above, HAZ 30 generally consists of the one or more regions of the corresponding workpiece 16 that, during welding, are heated to a temperature at which the metal therein becomes so sensitive to air that this metal could be detrimentally affected, e.g., contaminated, if exposed to air. As those skilled in the art will appreciate, the size of HAZ 30 will be affected by a number of factors, including the type of base metal of each workpiece 16, the thickness of each workpiece, the type of welding process 18 used, the speed of the welding process, the size and type of weld 12 formed, and the number of passes needed to form the weld, among others. Accordingly, those skilled in the art will understand how to determine or estimate the size of HAZ 30, which may affect the size of the region of each workpiece 16 covered with weld-through coating 14.

An important feature of welding method 10 of the present invention is the presence of weld-through coating 14 on workpieces 16 prior to welding. As used herein, and in the appended claims, the term "weld-through coating" means a coating applied to a workpiece for the purpose of protecting weld 12 and/or HAZ 30 in accordance with the present invention. Weld-through coating 14 may be applied anytime prior to forming weld 12. For example, weld-through coating 14 may be applied to each workpiece 16 in advance of that workpiece being welded, perhaps at a location separate from the location where welding is to be performed. Alternatively, weld-through coating may be applied generally contemporaneously with the formation of weld 12 just ahead of the location where the weld is being formed, e.g., using a coating applicator (see FIG. 2) moving in synchronization with welding tool 20, or otherwise. Various techniques for applying weld-through coating 14 are described below. In addition, recoating could take place between weld passes. After welding has been completed, weld-through coating and any byproducts resulting therefrom would typically be removed, e.g., by grinding, grit-blasting, or chipping, among other methods.

Weld-through coating 14 generally comprises a reactive material, i.e., a material containing one or more compounds and/or elements that react with air and/or an interstitial, or other, material(s) present in the base metal to form various byproducts. These reactive materials and/or their byproducts help protect weld faces 28 and HAZ 30 of workpieces 16 prior to, during, and/or subsequent to the formation of weld 12. Such compounds, elements, and/or byproducts are optimally lighter than the base metal so that they float to the top of the weld pool. Suitable compounds and/or elements for weld-through coating 14 may include compounds and/or elements used in refining, i.e., purifying, the corresponding air-sensitive metal. Optionally, weld-through coating 14 may additionally contain non-reactive elements that are preferably benign with respect to the base metal. Weld-through coating 14 is so called to indicate that welding may be performed through the coating. Weld-through coating 14 may provide an effectively hermetic barrier or otherwise provide a monolithic coating that adheres to each workpiece 16. As mentioned, weld-through coating 14 allows workpieces 16 to be welded in an ambient-air environment regardless of the air sensitivity of the base metal of the workpicce and, consequently, weld 12. Thus, for air-sensitive metals, weld-through coating 14 eliminates or reduces the need for shrouding weld 12 and HAZ 30 with an inert atmosphere presently necessary to form a quality weld.

The reactive material of weld-through coating 14 for titanium and titanium alloys may comprise one or more halogenides of alkali metals prior to welding. For example, the reactive material may include the fluorides of one or more of magnesium, sodium, calcium, strontium, and barium. In addition to fluorine-based halogenides, other halogenides of alkali metals based upon other halogens, such as chlorine and bromine, may be used. It is noted that these reactive materials are often used in the process of refining titanium because of their benefit to purifyng titanium. Similar reactive materials used in the refinement of other air-sensitive metals, e.g., molybdenum and tantalum, among others, may likewise be suitable for weld-through coatings 14 for these other air-sensitive metals because they similarly act to purify the corresponding metals. Other components of the weld-through coating 14 for titanium may include halogenides of lithium, sodium, and manganese, among others.

Weld-through coating formed from an reactive material may provide several benefits in addition to the benefits described above. For example, in the context of halogenides of alkali metals in conjunction with welding titanium, the presence of one or more halogenides can effect a reduction in the porosity of weld 12. This is desirable since the strength of weld 12 decreases with increasing porosity of the weld. In general, pores in a weld can be caused by hydrogen that may originate from gas entrapment, cathodic breakdown of absorbed water vapor, filler metal, or the base metal. Notably, porosity is not decreased simply by welding in an inert environment. Halogenide flux(es), such as provided by weld-through coating 14, however, bind hydrogen by forming $TiF_xH_y$ compounds that, in turn, reduce the porosity of weld 12. The reduction of porosity in welds increases the strength of the weld beyond the strength produced using the same welding process 18 without the presence of the halogenide flux(es). Halogenide flux(es) can also cause a contraction in the arc in certain welding processes 18, such as TIG. The contraction of the arc can increase the penetration depth of the arc, which can reduce the width of weld 12 and required heat input. This arc contraction can reduce the size of HAZ 30 that needs to be protected by weld-through coating 14. In addition, the size of the weld pool of weld 12 may be reduced so that it may become possible to form joints in a vertical plane that would otherwise not be possible due to the effect of gravity on the weld pool.

Weld-through coating 14 may be applied in any thickness, e.g., about 25 $\mu$m to several millimeters, with greater thicknesses being generally preferred. As mentioned above, weld-through coating 14 preferably should, but need not, cover weld faces 28 and HAZ 30 of each workpiece 16. Of course, weld-through coating 14 may extend beyond HAZ 30, as shown in the drawings, to ensure that the HAZ receives all of the benefit that the weld-through coating may provide. In addition, weld-through coating 14 preferably should, but need not, have an in-situ density of about 75% or more of the theoretical maximum density of the particular material of which weld-through coating is made. Weld-through coating 14 may optionally include one or more gettering materials, such as magnesium, aluminum, and titanium, among others, that can scavenge air from a region of the atmosphere surrounding weld 12 and/or HAZ 30 to enhance the shielding effect of the weld-through coating. The gettering material(s) may optimally be lighter than the base metal of workpiece 16 and filler metal, if present, so that the gettering material(s) would rise to the surface of weld pool of weld 12 or remain suspended in the molten weld-through coating 14.

Figure 2:
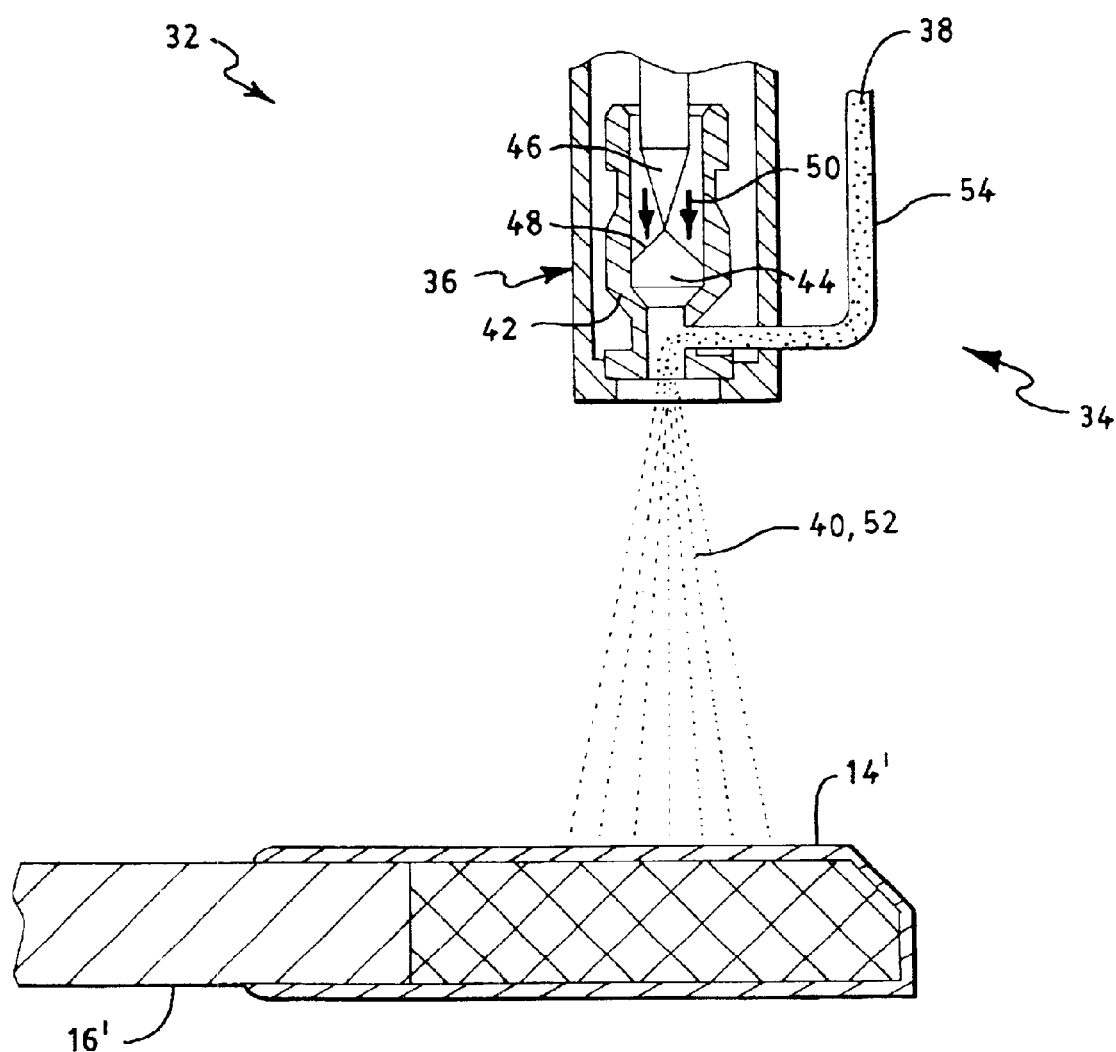
FIG. 2 is an enlarged cross-sectional view showing a weld-through coating of the present invention being applied with a plasma-spray system.

Weld-through coating 14 may be applied by, e.g., thermal spraying, chemical vapor deposition, sol-gel application, or dip-coating process, among others. FIG. 2 illustrates weld-through coating 14 being applied using a plasma-spray process 32, which is a type of thermal spraying. As those skilled in the art will readily appreciate, thermal spraying may be accomplished in using other processes, such as flame coating or high-velocity oxy fuel (HVOF), among others.

Plasma-spray process 32 generally utilizes a plasma-spray system 34 that includes a plasma gun 36 to heat a precursor powder 38 of the weld-through coating material to a temperature above the melting point of the precursor powder and to eject molten precursor powder 40 in a direction toward workpiece 16' where the application of weld-through coating 14' is desired. Molten precursor powder 40 then strikes and adheres to workpiece 16' and/or any previously-deposited weld-through coating 14' to form a generally cohesive, monolithic coating layer. An example of a suitable plasma-spray system 34 is the SG-100 Plasma Spray Gun powered by a PS-100 Plasma Power Source controlled by a 3702 Plasma Power Console available from Praxair, Inc., Danbury, Conn. Those skilled in the art will be familiar with this and/or similar plasma-spray systems, such that a detailed explanation of plasma-spray system 34 is not required herein.

In general, however, plasma gun 36 may generally include an anode nozzle 42 having a central passageway 44 and a cathode 46 extending into the central passageway. When plasma gun 36 is energized, an electrical arc 48 forms in central passageway 44 between anode nozzle 42 and cathode 46, causing one or more gases 50, e.g., argon and helium, supplied to the anode nozzle to ionize and form a hot plasma. The plasma is then ejected from anode nozzle 42 as a high velocity plasma stream 52. Precursor powder 38 is delivered from a delivery conduit 54 from a precursor powder storage bin (not shown) into plasma stream 52 near the exit end of anode nozzle 42. When precursor powder 38 enters plasma stream 52, it begins to melt and is ejected from anode nozzle 42 along with the plasma stream. Molten precursor powder 40 may then travel to workpiece 16' where it accumulates thereon and rapidly solidifies.

Plasma gun 36 and/or workpiece 16' may be moved relative to one another either manually or automatically to deposit weld-through coating 14' onto the desired region(s) of the workpiece. As an illustration of application conditions with the Praxair plasma-spray system 34 noted above, plasma gun 36 may be positioned approximately 4 inches to 7 inches from a workpiece 16' and moved relative to the workpiece so as to deposit a layer of weld-through coating 14' in a thickness of about 10 $\mu$m to about 40 $\mu$m per pass. Those skilled in the art will readily appreciate that these application conditions are generally specific to this particular Praxair plasma-spray system 34 and, therefore, can vary, perhaps significantly, depending upon the type of system used and other factors.

Halogenides of alkali metals are typically commercially available at a relatively low cost in powdered form. To plasma-spray a material successfully, in general it must have a suitable melting point, preferably above 500° C., exist in a particle size distribution amenable to flowing through delivery conduit 54 of plasma system 34, preferably -325 mesh, +10 $\mu$m for conventional plasma-spray equipment, and not be combustible in air. In addition, to act as a successful weld-through coating material for the air sensitive base metal of workpiece 16', a material should have a melting point lower than the melting point of the base metal.

The following Table shows exemplary materials that may be provided in the form of a suitable precursor powder 38 for weld-through coating 14' when base metal is titanium, which has a melting point of 1668° C., or a titanium alloy. Those skilled in the art will appreciate that these materials may also be suitable for weld-through coating 14' for an air-sensitive base metal other than titanium. Moreover, as noted above, weld-through coating 14' may be made from other precursor powders as well. It is noted that the purities shown in the Table are representative. The precursor powders 38 listed may have higher or lower purities and still provide a suitable shielding function when applied as weld-through coating 14'.

TABLE

| Halogenide | Particle Size Distribution | Melting Point | Purity |
| --- | --- | --- | --- |
| $BaF_2$ | -40 mesh, +10 $\mu$m | 1280° C. | 99% |
| $CaF_2$ | -325 mesh, +10 $\mu$m | 1403° C. | 99.5% |
| $SrF_2$ | -325 mesh, +10 $\mu$m | 1473° C. | 99% |

As mentioned above, other halogenides, such as $LiF_2$, $NaF_2$, and $MnF_2$, may be used in weld-through coating 14' of the present invention. It is noted that the melting points of these other halogenides are lower than the melting points of the halogenides appearing in the above Table and particle sizes (average on the order of a few micrometers) of these other halogenides are generally not suitable for plasma spraying on their own. However, these other halogenides may be beneficial when used with other halogenides, such as the halogenides listed in the Table above. In addition, these other halogenides may be used alone or in combination with one another if an application process other than plasma spraying is used.

While the present invention has been described in connection with a preferred embodiment, it will be understood that it is not so limited. On the contrary, it is intended to cover all alternatives, modifications and equivalents as may be included within the spirit and scope of the invention as defined above and in the claims appended hereto.

What is claimed is:

1. A method of welding a workpiece having a weld face, comprising the step of:
    forming at the weld face a weld through a monolithic weld-through flux coating applied to the weld face, wherein said monolithic weld-through flux coating comprises at least one halogenide of alkali metal.

2. A method according to claim 1, wherein the workpiece comprises an air-sensitive metal and the step of forming said weld is performed in an ambient-air environment.

3. A method according to claim 2, wherein said weld has a yield strength and a fatigue strength at least substantially equal to the corresponding yield and fatigue strengths of a comparably-sized weld formed in a conventional gas-shielded environment.

4. A method according to claim 1, further comprising, following the step of forming said weld, the step of removing from the workpiece any byproduct of said at least one halogenide of alkali metal resulting from forming said weld and removing from the workpiece any unreacted portion of said monolithic weld-through flux coating.

5. A method according to claim 1, wherein said at least one halogenide of alkali metal consists essentially of one or more halogenides of alkali metal.

6. A method according to claim 1, further comprising the step of applying said monolithic weld-through flux coating prior to the step of forming said weld.

7. A method according to claim 6, wherein the step of applying said monolithic weld-through flux coating is performed by thermal spraying.

8. A method according to claim 6, wherein the step of applying said monolithic weld-through flux coating is performed by chemical vapor deposition.

9. A method according to claim 6, wherein the step of applying said monolithic weld-through flux coating is performed by applying said weld-through coating as a sol.

10. A method according to claim 6, wherein the step of applying said monolithic weld-through flux coating is performed by dipping.

11. A method according to claim 6, wherein the step of applying said monolithic weld-through flux coating is performed substantially contemporaneously with the step of forming said weld.

12. A method according to claim 6, wherein the step of applying said monolithic weld-through flux coating includes applying said monolithic weld-through flux coating to a thickness of at least 25 micrometers.

13. A method according to claim 12, wherein said monolithic weld-through flux coating is applied to a thickness of at least 1 mm.

14. A method according to claim 6, wherein the step of applying said monolithic weld-through flux coating includes applying a precursor material of said monolithic weld-through flux coating to an in-situ density of at least 75% of the theoretical maximum density of said precursor material.

15. A method according to claim 6, wherein the workpiece has a heat-affected zone and the step of applying said monolithic weld-through flux coating includes applying said monolithic weld-through flux coating substantially only at the heat-affected zone.

16. A method of welding a workpiece made of an air-sensitive base metal, comprising the step of:
    forming, in an ambient-air environment, a weld through a monolithic weld-through flux layer applied to the workpiece, said monolithic weld-through flux layer comprising a reactive material.

17. A method according to claim 16, wherein said reactive material comprises at least one halogenide of alkali metal.

18. A method according to claim 17, wherein said reactive material consists essentially of one or more halogenides of alkali metal.

19. A method according to claim 16, wherein said monolithic weld-through flux layer is a weld-through coating.

20. A method of welding a workpiece, comprising the step of:
    applying a monolithic weld-through flux coating to the workpiece, wherein said monolithic weld-through flux coating comprises at least one halogenide of alkali metal.

21. A method according to claim 20, wherein the step of applying said monolithic weld-through flux coating is performed by thermal spraying.

22. A method according to claim 21, wherein thermal spraying is plasma spraying.

23. A method according to claim 20, wherein the step of applying said monolithic weld-through flux coating is performed by chemical vapor deposition.

24. A method according to claim 20, wherein the step of applying said monolithic weld-through flux coating is performed by applying a sol to the workpiece.

25. A method according to claim 20, wherein the step of applying said monolithic weld-through flux coating is applied by dipping.

26. A method according to claim 20, wherein the workpiece has a heat-affected zone and the step of applying said monolithic weld-through flux coating includes applying said monolithic weld-through flux coating substantially only at the heat-affected zone.

27. A method according to claim 20, wherein said reactive material consists essentially of one or more halogenides of alkali metal.

28. A method according to claim 20, wherein said monolithic weld-through flux coating comprises a gettering material.

29. A method according to claim 20, wherein the step of applying said monolithic weld-through flux coating includes applying said monolithic weld-through flux coating to a thickness of at least 25 micrometers.

30. A method according to claim 29, wherein said monolithic weld-through flux coating is applied to a thickness of at least 1 mm.

31. A method according to claim 20, wherein the step of applying said monolithic weld-through flux coating includes applying a precursor material of said monolithic weld-through flux coating to an in-situ density of at least 75% of the theoretical maximum density of said precursor material.

32. A method of joining a first part having a first heat-affected zone made of titanium or titanium alloy to a second part having a second heat-affected zone made of titanium or titanium alloy with a weld, comprising the steps of:
    applying a weld-through coating containing a reactive material to at least a portion of at least one of the first and second heat-affected zones; and
    forming a weld through said weld-through coating in an ambient-air environment.

33. A method of assembling a structure, comprising the steps of:
    positioning a first weld face of a first workpiece adjacent a second weld face of a second workpiece adjacent said first weld face, said first workpiece having applied thereto at least at said first weld face a first monolithic weld-through flux coating containing a reactive material; and
    forming in an ambient-air environment a weld between said first and second workpieces by welding through said first monolithic weld-through flux coating.

34. A method according to claim 33, wherein said second workpiece has applied thereto at least at said second weld face a second monolithic weld-through flux coating containing a reactive material and the step of forming said weld includes welding through at least a portion of said first and second weld-through coatings.

* * * * *